United States Patent
Dinger

(10) Patent No.: US 6,744,176 B2
(45) Date of Patent: Jun. 1, 2004

(54) PIEZOELECTRIC MOTOR

(75) Inventor: Rudolf Dinger, Saint-Aubin (CH)

(73) Assignee: Asulab S.A., Marin (CH)

( * ) Notice: Subject to any disclaimer, the term of this patent is extended or adjusted under 35 U.S.C. 154(b) by 25 days.

(21) Appl. No.: 10/209,897

(22) Filed: Aug. 2, 2002

(65) Prior Publication Data

US 2003/0030351 A1 Feb. 13, 2003

(30) Foreign Application Priority Data

Aug. 9, 2001 (CH) .............................. 1485/01

(51) Int. Cl.⁷ ................................ H02N 2/12
(52) U.S. Cl. ...................... 310/323.05; 310/323.02; 310/323.04; 310/323.06; 310/323.09; 310/348
(58) Field of Search ................. 310/323.01–323.06, 310/323.08, 323.09, 323.16, 328, 348

(56) References Cited

U.S. PATENT DOCUMENTS

| | | | |
|---|---|---|---|
| 4,562,374 A | * 12/1985 | Sashida | 310/328 |
| 4,871,937 A | * 10/1989 | Kawai | 310/323.05 |
| 4,918,351 A | * 4/1990 | Kawai | 310/323.05 |
| 5,264,753 A | * 11/1993 | Mukohjima et al. | 310/323.05 |
| 5,313,132 A | * 5/1994 | Nakanishi | 310/348 |
| 6,242,846 B1 | * 6/2001 | Ashizawa et al. | 310/323.02 |
| 6,384,513 B1 | * 5/2002 | Oono et al. | 310/323.05 |

FOREIGN PATENT DOCUMENTS

| | | | |
|---|---|---|---|
| EP | 325 062 | 7/1989 | |
| EP | 580 049 | 1/1994 | |
| JP | 6-22568 | * 1/1994 | 310/323.02 |

OTHER PUBLICATIONS

Patent Abstracts of Japan, vol. 013, No. 270 (E–776), Jun. 21, 1989 & JP 01 060271 (Matsushita Electric Ind Co Ltd.) Mar. 7, 1989.

* cited by examiner

Primary Examiner—Thomas M. Dougherty
(74) Attorney, Agent, or Firm—Sughrue Mion, PLLC

(57) ABSTRACT

The present invention concerns a piezoelectric motor of the type including:
- a stator (2);
- a rotor (20) capable of moving in rotation in a plane (Pdm) called the mean movement plane perpendicular to a geometrical rotational axis (X1) on which the rotor (20) is centred;
- coupling means (8) for driving the rotor (20) arranged between the stator (2) and said rotor (20);
- piezoelectric means (12) capable of being electrically excited to impart a vibratory movement onto the coupling means (8);
- transmission means (40) able to transmit the vibratory movement from the coupling means (8) to the rotor (20) in order to drive said rotor (20) in rotation about its axis (X1), and
- holding means (44) for applying the rotor (20) onto the coupling means (8), characterised in that the coupling means (8) are arranged freely about the geometrical rotational axis (X1) on which they are centred, and in that the coupling means (8) rest on the stator (2) via support means (10) shaped to convert the vibratory movement of the points (P) in the contact region between the coupling means (8) and the rotor (20) into a substantially elliptical forward or backward movement, essentially perpendicular to the plane of the rotor (20).

19 Claims, 3 Drawing Sheets

PIEZOELECTRIC MOTOR

The present invention concerns a piezoelectric motor.

A piezoelectric motor is already known from European Patent Application No. 537 446 in the name of the Applicant. This piezoelectric motor includes a stator mounted, for example by being forcibly driven or bonded onto a stepped arbour which is located on the rotational axis of said motor. This piezoelectric motor further includes a rotor, which is held in axial contact on the stator via support means. A disc-shaped piezoelectric transducer is arranged beneath the stator. This piezoelectric transducer may be formed, for example, by a ceramic element capable of being electrically excited to induce a vibratory movement in the stator. Means for transmitting the vibratory movement to which the stator is subjected are arranged on the rotor, this transmission means being formed by deflectable tongues, which can be deformed elastically.

When subjected to an electric excitation voltage, the piezoelectric element vibrates radially. The vibration of the piezoelectric element induces mechanical stresses in the stator via the effect of which the latter will begin to vibrate vertically, on either side of its rest position. The deformation by deflection of the stator, and thus the essentially linear movement of each point of the stator, are converted into a concomitant rotational movement of the rotor, owing to the elastically deformable deflectable tongues through which the rotor rests, via its external periphery, on the stator. The deflectable tongues, while being stressed by the stator which vibrates axially, bend and induce in the rotor velocity components tangential to the periphery of the rotor.

The piezoelectric motor described hereinbefore has the merit of being able to be miniaturised, of being capable of delivering a significant driving torque, and of having a simple structure able to be series manufactured at low costs. Unfortunately this piezoelectric transducer is only able to rotate in a single direction. This is due to the fact that conversion of the stator's axial vibratory movement into a rotational movement of the rotor is assured by the aforementioned deflectable tongues, which, with a straight line parallel to the rotational axis of the piezoelectric motor, form an angle which is fixed during the manufacturing operations of said motor and which cannot be modified during operation of the latter. It is thus impossible to have this rotate in the opposite direction. In order to overcome this problem, one could envisage providing the rotor with deflectable tongues alternately having a positive or negative angle of inclination with respect to a straight line parallel to the rotational axis of the motor. However, it is not known how to make the piezoelectric element vibrate to excite only the deflectable tongues oriented in one direction to the exclusion of the tongues oriented in the other direction and vice versa.

There is also known from U.S. Pat. No. 4,918,351 in the name of the Olympus Optical company, a conventional progressive wave piezoelectric motor. This motor includes a plurality of juxtaposed piezoelectric elements bonded onto the lower surface of an element whose role is to amplify the deformation movement of said piezoelectric elements and to avoid any direct contact between these piezoelectric elements and the rotor. The rotor is in contact with the movement amplifier element via a thin friction layer. The orientation of the dipole moments of the electrostrictive elements is reversed from one such element to that arranged just next to it such that, by introducing a phase shift between the excitation voltages of said electrostrictive elements, it is possible to create a progressive deformation wave in the amplifier element. In order to change the rotational direction of the motor, one need only reverse the phase shift between the excitation voltages. The Olympic motor also includes resilient arms which are fixed, at their base, to the stator, and which are in sliding support contact with the electrostrictive disc at their other end. These arms play no role in the rotational movement of the motor and their only purpose, by being resiliently deformed, is to absorb the vibrations generated by the operation of the motor, and thus to prevent these vibrations spreading to the stator.

Although it is able to rotate in both directions, the Olympus progressive wave motor suffers from the fact that it is difficult to guarantee contact with the necessary precision when the motor components are being manufactured. The Olympus progressive wave motor includes, for this reason, a stamped part which compensates for the mechanical tolerances and variations due to wear between the contact elements. The structure of the progressive wave motor is thus rather complicated and is difficult to miniaturise at acceptable costs.

The object of the present invention is to overcome the aforementioned problems of the prior art in addition to others, by proposing a cheap and miniaturisable piezoelectric motor capable of moving in both rotational directions.

The present invention thus concerns a piezoelectric motor of the type including:

a stator;

a rotor capable of moving in rotation in a plan called the mean movement plane perpendicular to a geometrical rotational axis on which the rotor is centred;

coupling means for driving the rotor arranged between the stator and said rotor;

piezoelectric means capable of being electrically excited to impart a vibratory movement onto the coupling means;

transmission means able to transmit the vibratory movement from the coupling means to the rotor in order to drive said rotor in rotation about its axis, and holding means for applying the rotor onto the stator, characterised in that the coupling means are arranged freely about the geometrical rotational axis on which they are centred, and in that the coupling means rest on the stator via support means shaped to convert the vibratory movement of the points in the contact region between the coupling means and the rotor into a substantially elliptical forward or backward movement, essentially perpendicular to the plane of the rotor.

Owing to these features, the present invention provides a piezoelectric motor able to rotate forwards or backwards. In order to achieve this object, the piezoelectric motor according to the invention is shaped such that the points of the coupling means in the contact region between said coupling means and the rotor describe a substantially elliptical trajectory, perpendicularly to the plane of the rotor, either in the direct trigonometric direction, or in the opposite direction, such that said rotor can be driven forwards or backwards. The elliptical movement is formed of a substantially circular movement in the plane of the coupling means and an axial vibratory movement of said coupling means. Indeed, assuming that the vibratory movement of the coupling means is in the phase in which the latter are axially deformed downwards at their centre, it is observed that because of the structure of the support means via which the coupling means rest on the stator, the downward axial deformation of said coupling means imparts thereto an angular pivoting movement. Moreover, at the same time that the centre of the coupling means is deformed axially downwards, their external periphery can either be deformed axially upwards or downwards as a function of the frequency of the excitation signal which is applied to the piezoelectric means. Thus, the combination of the angular pivoting movement which arises from the downward axial deformation of the centre of the coupling means and the positive or negative extension movement, i.e. beyond or short of their rest position, of the external periphery of said coupling means, generates an elliptical movement of said external periphery of said coupling means, which are then able to drive the rotor in rotation. Moreover, depending upon whether the centre and the periphery of the coupling means are deformed in phase, i.e. they are both deformed axially downwards during the same half-period of the excitation signal of the piezoelectric means, or in phase opposition, i.e. the centre of the coupling means is deformed by bending downwards while the periphery of said coupling means moves upwards, this generates a reversal of the rotational direction of the rotor.

Other features and advantages of the present invention will appear more clearly upon reading the following detailed description of an example embodiment of the piezoelectric motor according to the invention, this example being given purely by way of non-limiting illustration, in conjunction with the annexed drawings, in which.

The present invention proceeds from the general inventive idea consisting in providing a piezoelectric motor capable of operating both forwards and backwards. In order to achieve this object, the present invention teaches mounting coupling means freely about the geometric axis on which they are centred, and resting said coupling means on the motor stator via support means shaped to convert the vibratory movement induced in said coupling means by piezoelectric means into a substantially elliptical movement at the contact zone between the coupling means and the rotor, perpendicularly to the plane in which said rotor moves. As a function of the frequency of the electric signal selected to excite the piezoelectric means, the coupling means vibrate in other resonance modes and the centre of the coupling means and the contact region between the coupling means and the rotor are deformed either in phase, or in phase opposition, such that the points of said contact region describe an elliptical trajectory in the direct trigonometric direction or in the opposite direction, which enables the rotor to be driven forwards or backwards.

The present invention will be described in conjunction with a timepiece. Indeed, the use of piezoelectric motors proves particularly interesting and advantageous within the field of horology, insofar as such motors are able to provide high torques. In particular, piezoelectric motors are used to drive mechanisms indicating the date, also called date mechanisms. The piezoelectric motor according to the invention has the additional advantage of being able to operate both forwards and backwards, such that, when it is utilised to drive a date mechanism, it enables the user of a watch fitted with such a motor to adjust the date by selecting the direction (forwards or backwards) in which the date indicator moves. Such a feature is advantageous, in particular as regards watches whose movement is powered by means of a solar cell. It is known, in fact, that only the quartz oscillator and the frequency divider circuit of such watches continue to operate in obscurity. Thus, when the user wishes to wear his watch again, depending upon the date displayed by said watch, he will choose the direction of movement of the date mechanism that allows him to reach the date of the current day most quickly.

It goes without saying that the example described hereinbefore of applying the piezoelectric motor according to the invention to driving the date mechanism of a timepiece is given purely by way of non-limiting illustration. Indeed, the piezoelectric motor according to the present invention can be used in many other fields such as robotics, bio-medical engineering, or aeronautics, in which motors that are insensitive to magnetic fields and capable, despite their compactness, of providing a significant torque at low rotational speeds, are always being sought.

Figure 1:
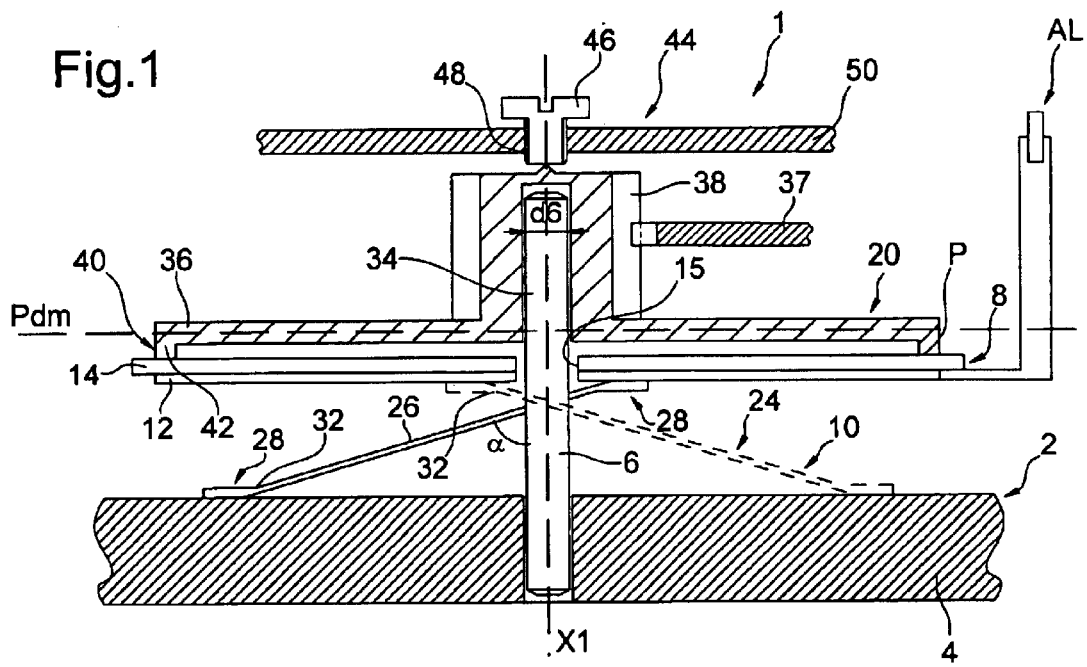
FIG. 1 is a cross-section of a piezoelectric motor according to the present invention.

With reference to FIG. 1, an embodiment of the piezoelectric motor according to the invention will be described hereinafter, this motor being designated as a whole by the general reference numeral 1.

Motor 1 includes a stator 2 which, in this example, is formed by a plate 4 in which an arbour or pin 6 is embedded and fixedly held, for example by being forcibly driven into plate 4 or bonded thereto. Arbour 6 projects from stator 2 by extending perpendicularly thereto.

As can be seen in FIG. 1, arbour 6 is of generally cylindrical external shape and forms a geometric axis X1 which will be called hereinafter the geometric rotational axis. Stator 2 and arbour 6 can be made of a metallic material such as brass or a steel alloy. The assembly formed by plate 4 and pin 6 thus constitutes a fixed structure forming stator 2 of piezoelectric motor 1 according to the invention.

Coupling means 8 are, contrary to common practice, mounted not fixedly, but arranged to be free both in rotation and in translation about pin 6 with respect to which they are centred. These coupling means 8 rest on stator 2 via support means 10, which will be described in detail hereinafter. On-coupling means 8, which are thus capable of vibrating with respect to stator 2, are mounted piezoelectric means 12 formed of a piezoelectric ceramic element, for example of the PZT type (mixture of lead titanate and lead zircone), and at least two electrodes (not shown in the drawing) which are connected in a conventional manner to an electric power supply AL, shown schematically here. Piezoelectric means 12 thus form a transducer, which, in response to a variable frequency electric excitation provided by supply AL via the electrodes, can have a vibratory movement. These piezoelectricity phenomena and the construction and arrangement of such piezoelectric transducers in motors of the same type are well known to those skilled in the art and consequently will not therefore be described here in more detail.

Coupling means 8 include a disc 14 having at its centre a through orifice 15 through which disc 14 is freely engaged on arbour 6. Disc 14 which forms the frame of coupling means 8 is fixed, for example by laser welding, to abut axially against a collar 16 of a bush 18 (see FIG. 3) typically made by bar turning operations. It may be made of a metallic material such as, for example, a copper-beryllium alloy, or, for example, of a ceramic or plastic material.

Coupling means 8 further include aforementioned support means 10 which can also be fixed by laser welding to the base of bush 18. These support means 10 are shaped such that the points in the contact region between coupling disc 14 and rotor 20 describe a substantially elliptical trajectory, perpendicularly to rotational plane Pdm of said rotor 20, either in the direct trigonometric direction, or in the opposite direction, such that rotor 20 can be driven forwards or backwards as will be seen in more detail in the following part of the present description.

In order to achieve the aforementioned object, support means 10 include (see FIGS. 2 and 3) a disc 22 of small thickness, for example made of spring steel, and secured by any appropriate means such as, particularly welding, onto collar 16 of bush 18. Support means 10 further include legs 24 which are fixed onto stator 2. Only three of these legs 24 are shown in the Figures, the minimum number necessary to define a stable pivoting plane for coupling disc 14, but it will be understood, of course, that a larger number of legs 24 may be provided, the maximum number being determined, amongst other things, by the space requirement conditions. However, if the rotor is guided as shown in FIG. 1, the stator plane is defined by said rotor and, in this case, two legs are enough.

Each of legs 24 is formed of a rectilinear part 26 which has to be sufficiently rigid. For this purpose, rectilinear parts 26 can be shaped into profiled elements of, for example L-shaped cross section, as is visible in the cross-section made along line A–A' of FIG. 2. Rectilinear parts 26 whose cross-section is U-shaped may also be envisaged. In the case of an L-shaped cross-section, the width I1 of each of the arms of the L is approximately 0.5 mm and the thickness e1 of the arms is of the order of a tenth of a millimeter. Legs 24 further each include, at their lower ends, a foot 28 via which they are rigidly secured to stator 2 of motor 1. In the example shown in the drawing, feet 28 take the form of eyelets 30, i.e. small hollowed metallic parts of round shape which enable said feet 28 to be fixed to stator 2 by means of screws (not shown). It goes without saying that other fixing means such as, particularly, bonding or welding, may be envisaged to secure feet 28 to stator 2.

Figure 2:
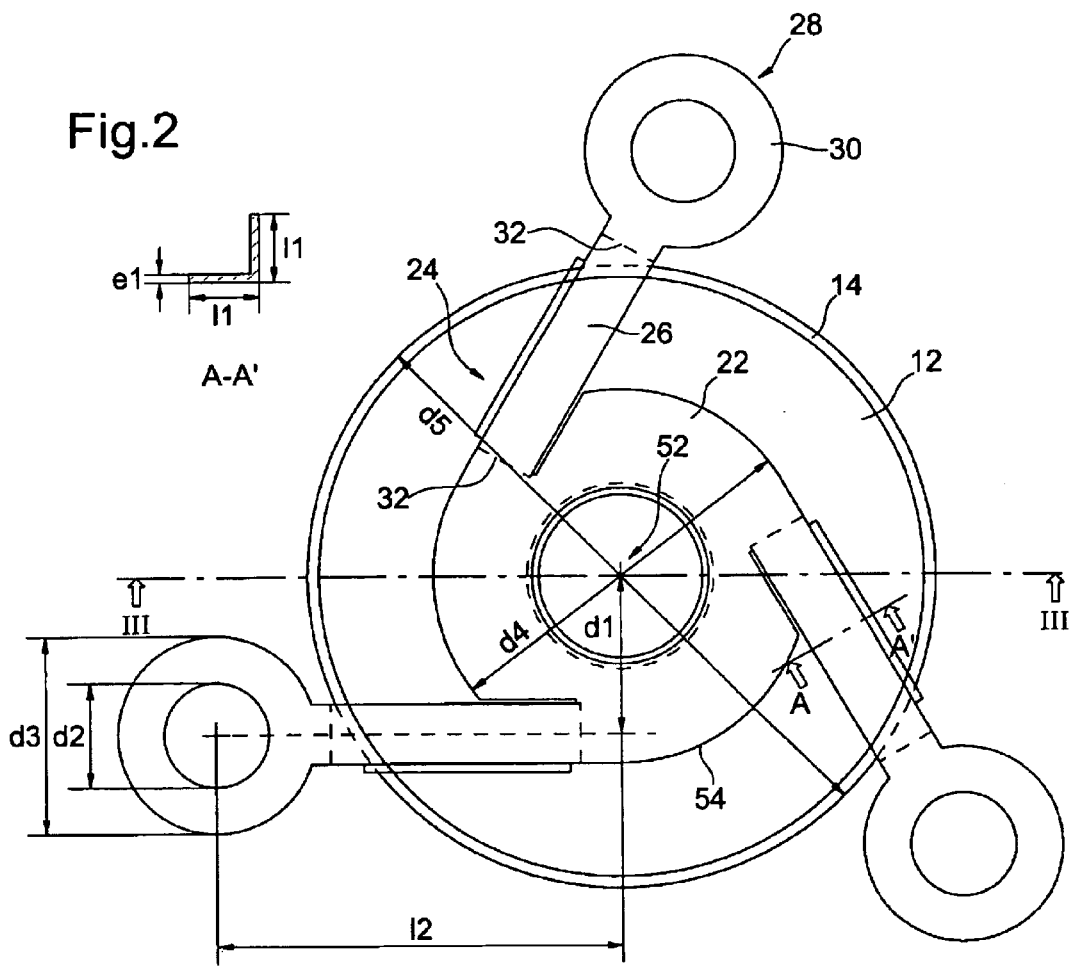
FIG. 2 is a bottom view of the piezoelectric motor shown in FIG. 1, the coupling means being suspended in a different manner.
Figure 3:
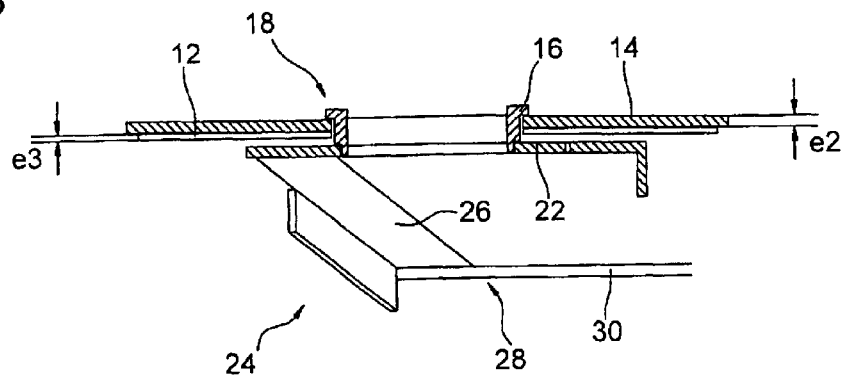
FIG. 3 is a cross-section along the axis III—III of FIG. 2.

As shown in FIGS. 2 and 3, legs 24 are made in a single piece with disc 22. Of course, according to a variant, legs 24 could be made separately, and fixed one at a time between coupling disc 14 and stator 2 of piezoelectric motor 1 according to the invention, as is illustrated in FIG. 1 in which it can be seen that each leg 24 ends at both of its ends in a foot 28. However, this complicates the assembly operations.

Legs 24 of support means 20 are hinged to feet 28 on the one hand, and to disc 22 with which they are integral, on the other hand, via a ball and socket joint type articulation 32. Actually, articulations 32 are capable of pivoting not only about an horizontal axis like a hinge, but also about an axis perpendicular to the plane defined by coupling disc 14, so as to allow the latter to pivot in its horizontal plane of movement while yielding or rising up vertically along the direction of the geometric rotational axis X1 about which said coupling disc 14 is centred.

Piezoelectric motor 1 according to the present invention further includes the aforementioned rotor 20 capable of moving in rotation with respect to stator 2 about geometric rotational axis X1. More precisely, rotor 20 rests in axial abutment on upper face of coupling disc 14, and is freely engaged through a central orifice 34 on the cylindrical external periphery of pin 6.

Rotor 20 includes, in this embodiment example, a disc 36 of small thickness made of a hard material such as a metal or hard plastic. This disc 36 forms a rigid carrier structure able to mesh with coupling means 37, for example of a date mechanism. In order to be able to mesh with the date mechanism, rotor 20 includes a pinion 38 which is made in a single piece with disc 36. It goes without saying however, that, according to an alternative embodiment, pinion 38 could be made in the form of a separated part fixed, for example by bonding, onto rotor 20.

Piezoelectric motor 1 further includes movement transmission means 40 shaped to transmit to rotor 20 the vibratory movement of coupling disc 14 and to allow rotor 20 to move in rotation about its axis X1. Rotor 20 is thus able to move in rotation in its mean displacement plane Pdm perpendicular to rotational axis X1.

Movement transmission means 40 are formed by rigid studs 42. As can be better seen in FIG. 1, these studs 42 are either embedded in disc 36 forming the carrier structure for rotor 20 and fixedly held by bonding, or overmoulded with the hard plastic material of which disc 36 is made. According to a variant, transmission means 40 could also be formed by a continuous ring extending over the entire length of the periphery of disc 36.

Rigid studs 42 for transmitting the vibratory movement of coupling disc 14 to rotor 20 are arranged at the periphery of disc 36. They extend perpendicularly to the surface of disc 14 forming the frame of coupling means 14 and are a minimum of three in number. Of course, a higher number of studs 42 can be envisaged, the maximum number being given by the maximum space requirement conditions. It will be noted that studs 42, which are interposed between rotor 20 and coupling disc 14, abut and rest directly on the front plane face of said coupling disc 14 which is smooth and is free of any protruding or projecting elements but which has however a rugosity coefficient which is sufficient to allow the rotor to be driven. Rigid studs 42 define with coupling disc 14 on which they abut contact points P which describe, as will be described hereinafter in more detail, a substantially elliptical trajectory, either in the direct trigonometric direction, or in the opposite direction. This movement of contact points P is generated by the oscillating movement which animates coupling disc 14 when piezoelectric means 12 are excited by an electric excitation signal of an appropriate frequency.

Still with reference to FIG. 1, it will be noted that rotor 20 is stressed in the axial direction towards coupling disc 14 via maintaining means 44. These means, which allow axial abutment of rotor 20 on coupling disc 14, are formed by a screw 46 mounted along the axis of pin 6 in said pin and screwed through a threaded hole 48 of a bridge 50 of the watch movement.

As can be seen in particular in FIG. 2, legs 24 of support means 10 are off-centre with respect to centre 52 of coupling disc 14, arranged at intervals of regular distance on a circle 54 concentric to said centre 52 of coupling disc 14. The distance d1 separating the longitudinal axis of symmetry of legs 24 from centre 52 of coupling disc 14 and the angle of inclination ($\alpha$) (see FIG. 1) of said legs 24 with respect to a straight line parallel to rotational axis X1 of rotor 20 determine the circular component of the elliptical movement of coupling disc 14 as will now be described in conjunction with FIGS. 5 and 6.

Figure 5:
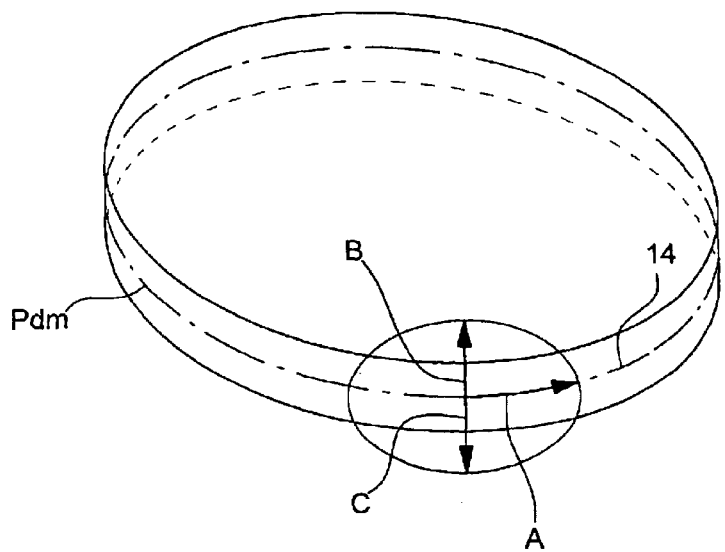
FIG. 5 is a view of the section of the coupling means on which the axial and circular movement directions of said coupling means are shown.

According to the present invention, and as is visible in FIG. 5 in which a section of coupling disc 14 is shown in the contact zone between said coupling disc 14 and rotor 20, points P of this contact zone describe a substantially elliptical trajectory, perpendicular to the plane of movement Pdm of rotor 20, either in the direct trigonometric direction, or in the opposite direction. Rotor 20 can thus be driven forwards or backwards. The elliptical movement is formed of a substantially circular movement and an axial vibration movement of coupling disc 14. Indeed, whatever the frequency of the electric signal selected to excite piezoelectric means 12, coupling disc 14, which is, let us recall, arranged to be free in rotation and translation about geometric axis X1 on which it is centred, is always deformed axially downwards at its centre 52 during a half-period of the electric excitation signal. This is confirmed by FIG. 6 in which it can be seen that, whether coupling disc 14 is excited in its fundamental mode f0 or in its first and second overtone or partial modes f1 and f2, centre 52 of coupling disc 14 is deformed by deflection below of its rest position which is shown in full lines in FIG. 6. This deformation is shown in a very exaggerated manner and, in reality, it does not exceed a beat amplitude higher than several microns.

The natural frequency of coupling disc 14 varies greatly with the vibration mode. This allows the desired vibration mode to be selected by exciting piezoelectric means 12 with a voltage having a frequency corresponding to the desired vibration mode. It will be noted that one will only select vibration modes which make axisymmetrical nodal circles appear, but not nodal diameter, such that all the points located on the same circle are animated by the same movement. Modes with nodal diameters could be employed and the movements could be integrated only on a part of the periphery if one is able to suitably adjust the angularly position of the one or more nodal diameters with the help of holes or centrifugal weights which interrupt the symmetry. When coupling disc 14 is animated in its fundamental mode f0, the deformation due to the bending stresses generated in coupling disc 14 owing to its vibratory movement induced by said piezoelectric means 12 give said coupling disc 14 a basin shape. The vibratory movement of piezoelectric means 12 and the resulting deformation of coupling disc 14 are both of the axisymmetrical type. In other words, all the points of coupling disc 14 located on the same circle centred about geometric axis X1 will simultaneously undergo the same elongation.

Because of the structure of support means 10 by which coupling disc 14 is supported by stator 2, the axial deformation downwards of said coupling disc 14 is converted into an angular pivoting movement (see arrow A, FIG. 5) of contact points P between coupling disc 14 and rotor 20, tangentially to the plane of movement Pdm of said rotor 20.

Moreover, at the same time that centre 52 of coupling disc 14 is axially deformed downwards, its external periphery 56 in the contact zone with rotor 20 can either be deformed axially upwards (see arrow B, FIG. 5), or downwards (see arrow C, FIG. 5), depending upon the vibration mode of coupling disc 14. Thus, the combination of the angular pivoting movement which arises from the downward axial deformation of centre 52 of coupling disc 14, and the positive or negative extension movement, i.e. beyond or short of its rest position, of external periphery 56 of said coupling disc 14, generates an elliptical movement of said external periphery 56 of said coupling disc 14 which is then able to drive rotor 20 in rotation. Further, depending upon whether centre 52 and periphery 56 of coupling disc 14 are deformed in phase, i.e. they are both deformed axially downwards during the same alternation of the electric excitation signal of piezoelectric means 12, or in phase opposition, i.e. centre 52 of coupling disc 14 is deformed by deflection downwards while periphery 56 of said coupling disc 14 moves upwards, this generates a reversal of the rotational direction of rotor 20.

Figure 6:
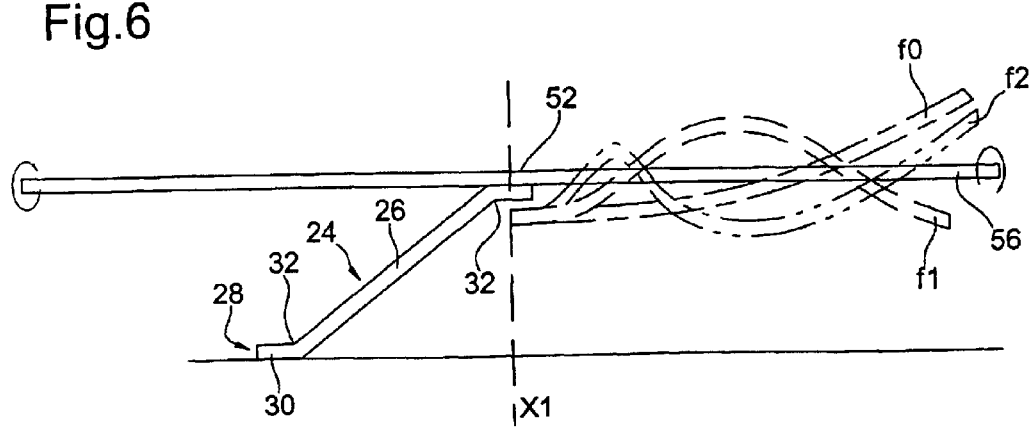
FIG. 6 is a section view of the coupling means shown in full lines in their rest position, and in dot and dash lines in their end deformation positions when the coupling means are excited in vibration by the piezoelectric means.
Figure 4:
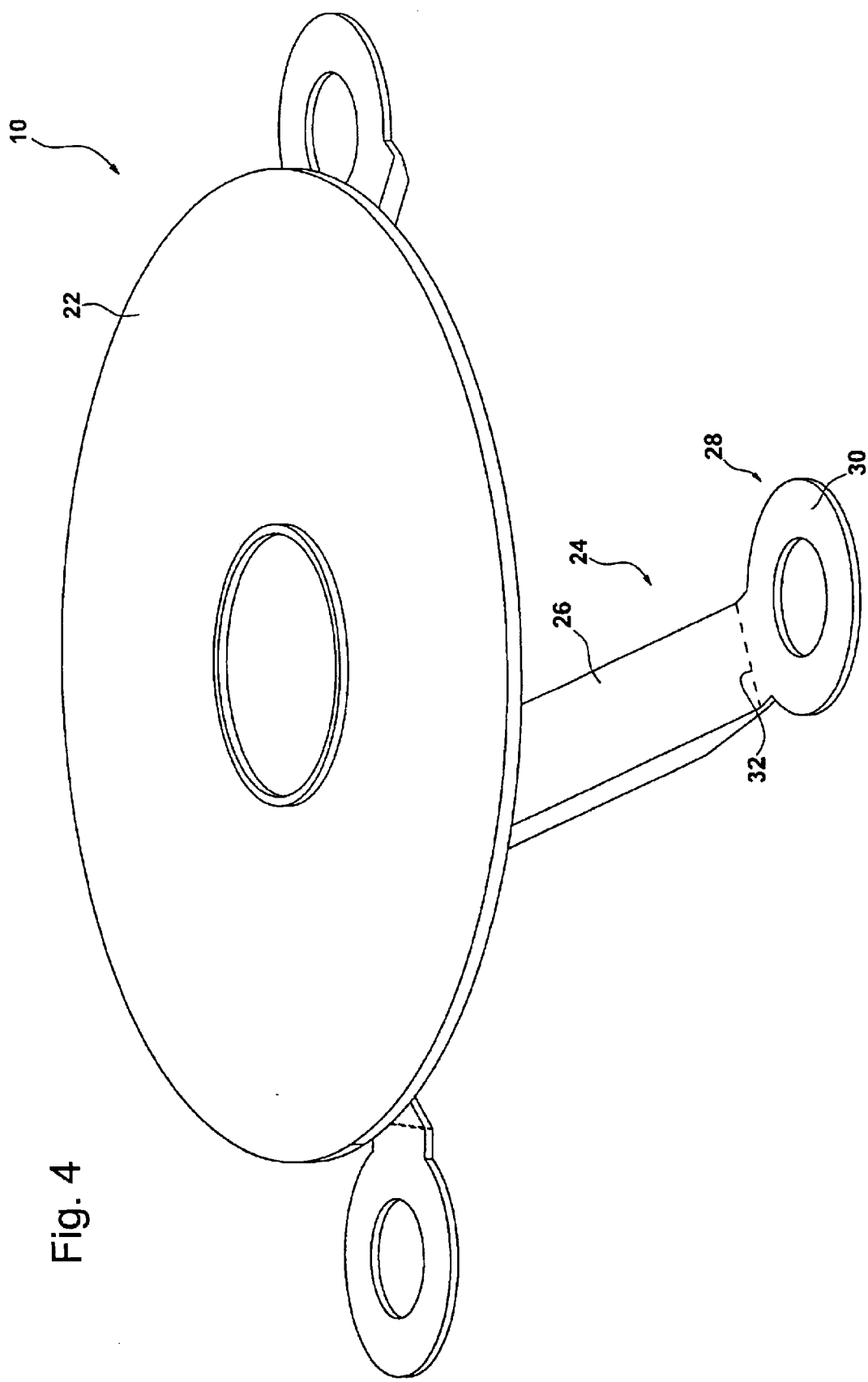
FIG. 4 is a perspective view of the support means via which the coupling means rest on the stator.

The aforementioned features appear clearly in FIG. 6 in which it can be seen, particularly, that when coupling disc 14 is excited in its fundamental mode f0, centre 52 and periphery 56 of coupling disc 14 are axially deformed in phase opposition. In other words, centre 52 of coupling disc 14 is deformed by deflection downwards, while its periphery 56 has a deflection deformation upwards. As a result of this vibration mode of coupling disc 14, contact points P between said coupling disc 14 and rotor 20 describe an elliptical movement which allows said rotor 20 to be driven in a given direction, for example forwards.

When the excitation frequency of piezoelectric means 12 is gradually increased, in order to pass from fundamental excitation mode f0 to first overtone excitation mode f1 of coupling disc 14, it will be noted that centre 52 and periphery 56 of coupling disc 14 vibrate this time in phase, in other words they are simultaneously deformed by deflection downwards during a same alternation of the electric excitation signal of said piezoelectric means 12. In this second vibration mode, points P of the contact zone between coupling disc 14 and rotor 20 again describe an elliptical trajectory, but in the opposite direction to hereinbefore, which allows said rotor 20 to be driven backwards this time. It will be noted that in its first overtone mode f1, coupling disc 14 has a passage through a zero amplitude value. Vibratory mode f1 thus makes a nodal circle appear, in other words a vibration node, in said coupling disc 14, which is explained by the fact that the centre of gravity of coupling disc 14 has to be kept when the latter generates a vibratory movement and is deformed.

When one continues to increase the excitation frequency of piezoelectric means 12 in order to make coupling disc 14 pass from its first overtone excitation mode to its second overtone excitation mode f2, it will be noted that the centre 52 and periphery 56 of said coupling disc 14 again vibrate in phase opposition, i.e. said centre 52 is deformed by deflection downwards at the same time that said periphery 56 is deformed by deflection upwards. In this third vibration mode, the points P of the contact zone between coupling disc 14 and rotor 20 still describe an elliptical trajectory, but in the opposite direction to that corresponding to first overtone mode f1. One can thus again reverse the working direction of piezoelectric motor 1 according to the present invention. It will be noted that, in its second overtone excitation mode f2, coupling disc 14 has two passages through zero amplitude values. Vibration mode f2 thus cause two nodal circles, in other words two vibration nodes, to appear in said coupling disc 14.

As will have been understood from the foregoing, by passing the excitation mode of coupling disc 14 from its fundamental mode f0 to its first overtone mode f1, then second overtone mode f2, the rotational direction of piezoelectric motor 1 is reversed each time. Of course, one could restrict oneself, in order to reverse the rotational direction of said motor 1, to varying the frequency of the electric excitation signal only between the two values f0 and f1, thus passing coupling disc 14 from its fundamental vibration mode to its first overtone vibration mode and vice versa.

In the following paragraph, indications are provided relative to the geometric dimensions of the various constituent elements of piezoelectric motor 1 according to the present invention.

It will be recalled for the record that, in the case in which legs 24 of support means 10 are shaped in accordance with profiled elements of L-shaped cross-section, the width l1 of each of the arms of the L is approximately 0.5 mm, and the thickness e1 of these arms is of the order of a tenth of a millimeter. The length l2 of each of legs 24 taken from the centre of eyelets 30 forming the feet 28 of said legs 24 is 3.3 mm. The diameter d2 of the orifices of eyelets 30 is 0.8 mm, and the external diameter d2 of said eyelets is 1.5 mm. The distance d3 separating the longitudinal axis of symmetry of legs 24 from the centre of coupling disc 14 is 1.25 mm, and the diameter d4 of disc 22 with which said 24 are integral is 3.0 mm. The diameter d5 of coupling disc 14 is 5.0 mm and its thickness e2 is 0.2 mm. The thickness e3 of the disc of piezoelectric ceramic material is 0.1 mm. The diameter d6 of pin 6 is 1.2 mm. Finally, the angle of inclination α formed by legs 24 with a straight line parallel to rotational axis X1 of rotor 20 is typically comprised between 10 and 30°.

It goes without saying that the present invention is not limited to the embodiment that has just been described and that various simple modifications and variants may be envisaged without departing from the scope of the present invention. In particular, disc 14, which forms the frame of coupling means 14 and piezoelectric means 12, can be made in a single piece, entirely of ceramic PZT.

The present invention thus provides a piezoelectric motor whose operating principle rests on the fact that, via the effect of the application, to piezoelectric means, of an alternating voltage whose oscillation frequency is selected so as to coincide with one of the coupling disc's natural frequencies, the centre and the edge of said coupling disc are deformed axially in phase or in phase opposition. At the same time that it is axially deformed, the disc is forced to pivot by the support legs and drives the rotor in rotation. At the end of a period of the electric excitation signal, the disc moves downwards and is returned by the support legs to its initial position. This downward and backward movement by the coupling disc occurs in the almost total absence of any friction force between the disc and the rotor, such that any risk of said rotor moving backwards is prevented. It will be understood that depending upon whether the centre and the edge of the coupling disc vibrate in phase or in phase opposition, the rotor of the electrostrictive motor will be driven in rotation forwards or backwards. Thus, one need only modify the frequency of the excitation voltage to make the coupling disc vibrate in one or other of its natural modes and thus determine the rotational direction of the motor according to the invention.

What is claimed is:

1. A piezoelectric motor of the type including:
   a stator;
   a rotor capable of moving in rotation in a plane called the mean movement plane perpendicular to a geometrical rotational axis on which the rotor is centred;
   coupling means for driving the rotor arranged between the stator and said rotor;
   piezoelectric means capable of being electrically excited to impart a vibratory movement onto the coupling means;
   transmission means able to transmit the vibratory movement from the coupling means to the rotor in order to drive said rotor in rotation about its axis, and
   holding means for applying the rotor onto the coupling means,
   wherein the coupling means are arranged freely about the geometrical rotational axis on which they are centred, and in that the coupling means rest on the stator via support means shaped to convert the vibratory movement of the points in the contact region between the coupling means and the rotor into a substantially elliptical forward or backward movement, essentially perpendicular to the plane of the rotor, the support means being hinged to the stator on the one hand, and to the coupling means on the other hand, via a ball and socket joint type articulation.

2. The piezoelectric motor according to claim 1, wherein the support means are off-centre with respect to the centre of the coupling means, and form an angle of inclination with respect to a straight line parallel to the geometric rotational axis.

3. The piezoelectric motor according to claim 1, wherein the support means include at least two legs which are fixed to the stator.

4. The piezoelectric motor according to claim 3, wherein each leg is formed of a rectilinear part shaped as a profiled element.

5. The piezoelectric element according to claim 4, wherein the profiled element has an L-shaped or U-shaped cross-section.

6. The piezoelectric motor according to claim 3, wherein the legs each include, at their lower end, a foot via which they are fixed to the stator of the motor, said legs being made in a single piece at their upper end with a disc fixed to the piezoelectric means.

7. The piezoelectric motor according to claim 6, wherein the feet are shaped as eyelets which allow said feet to be fixed to the stator by means of screws.

8. The piezoelectric motor according to claim 6, wherein the feet are bonded or welded onto the stator.

9. The piezoelectric motor according to claim 1, wherein the coupling means is formed by a disc having at its centre a through orifice via which it is arranged freely about the geometric rotational axis, the piezoelectric means being mounted on this disc.

10. The piezoelectric motor according to claim 9, wherein the rotor includes a disc which forms a rigid carrier structure able to mesh with coupling means.

11. The piezoelectric motor according to claim 10, wherein, in order to be able to mesh with the coupling means, the disc includes a pinion which may be made in a single piece with said disc.

12. The piezoelectric motor according to claim 10, wherein the transmission means are formed by a continuous ring or by rigid studs arranged at the periphery of the disc and which are inserted between the coupling disc and the rotor.

13. The piezoelectric motor according to claim 11, wherein the transmission means are formed by a continuous ring or by rigid studs arranged at the periphery of the disc and which are inserted between the coupling disc and the rotor.

14. The piezoelectric motor according to claim 12, wherein the studs extend perpendicularly to the surface of the disc and abut directly against the front plane face of the coupling disc which is smooth and free of any protruding or projecting elements.

15. The piezoelectric motor according to claim 13, wherein the studs extend perpendicularly to the surface of the disc and abut directly against the front plane face of the coupling disc which is smooth and free of any protruding or projecting elements.

16. A piezoelectric motor according to claim 12, wherein the studs are either embedded in the disc forming the carrier surface of the rotor, or overmoulded with the same material as that from which said disc is made.

17. A piezoelectric motor according to claim 14, wherein the studs are either embedded in the disc forming the carrier surface of the rotor, or overmoulded with the same material as that from which said disc is made.

18. A piezoelectric motor according to claim 9, wherein the rotor is stressed in an axial direction towards the coupling disc via holding means.

19. A piezoelectric motor according to claim 18, wherein the holding means which allow the rotor to rest axially on the coupling disc are formed by a screw.

* * * * *